United States Patent
Hoche

(10) Patent No.: US 6,782,296 B2
(45) Date of Patent: Aug. 24, 2004

(54) METHOD AND APPARATUS FOR POSITIONING A MOVABLE ELEMENT USING A GALVANOMETER ACTUATOR AND PRE-FILTERING

(76) Inventor: Randolf Hoche, Huebnerstrasse 24, 80637 Munich (DE)

( * ) Notice: Subject to any disclaimer, the term of this patent is extended or adjusted under 35 U.S.C. 154(b) by 191 days.

(21) Appl. No.: 10/204,933

(22) PCT Filed: Feb. 9, 2001

(86) PCT No.: PCT/EP01/01454

§ 371 (c)(1), (2), (4) Date: Aug. 6, 2002

(87) PCT Pub. No.: WO01/59531

PCT Pub. Date: Aug. 16, 2001

(65) Prior Publication Data

US 2003/0011788 A1 Jan. 16, 2003

(30) Foreign Application Priority Data

Feb. 9, 2000 (DE) .......................................... 100 05 611

(51) Int. Cl.$^7$ ........................... G05B 13/02; G05B 13/04
(52) U.S. Cl. ............................ 700/28; 700/56; 359/223
(58) Field of Search ............................. 700/41, 42, 43, 700/12, 13, 56, 57, 62, 28; 702/150, 151; 359/223, 224, 225

(56) References Cited

U.S. PATENT DOCUMENTS

| | | | | |
|---|---|---|---|---|
| 5,301,101 A | * | 4/1994 | MacArthur et al. | 700/36 |
| 5,394,322 A | * | 2/1995 | Hansen | 700/37 |
| 5,532,926 A | * | 7/1996 | Dunn et al. | 700/73 |
| 5,543,251 A | * | 8/1996 | Taylor | 430/1 |
| 5,568,378 A | * | 10/1996 | Wojsznis | 700/44 |
| 5,726,879 A | * | 3/1998 | Sato | 700/56 |
| 6,038,067 A | * | 3/2000 | George | 359/368 |
| 6,046,966 A | * | 4/2000 | Drake et al. | 369/13.15 |
| 6,094,601 A | * | 7/2000 | Popovich | 700/28 |
| 6,505,085 B1 | * | 1/2003 | Tuttle et al. | 700/28 |
| 6,519,496 B1 | * | 2/2003 | Kawabe et al. | 700/55 |

\* cited by examiner

*Primary Examiner*—Emanuel Todd Voeltz
*Assistant Examiner*—Aaron Perez-Daple
(74) *Attorney, Agent, or Firm*—Burns & Levinson LLP; Frederick C. Williams; Yan Lan

(57) ABSTRACT

The invention relates to a method and a device, whereby a galvanometer actuator (7) that is connected to the element and a control unit are provided. Said unit generates a control signal for the actuator for adjusting the element according to a desired position time history that can be freely predetermined, whereby the control unit detects the control signal by means of the desired position time history and by considering a model (4) consisting of the unit of the actuator and the element. Said model is a time discrete state space model and is selected in such a way that said model can predict the position time history of the element for a time history of the control signal and with predetermined exactness, whereby said time history of the control signal can be freely predetermined. The predetermined desired position time history is verified by the control unit and by means of a preliminary filter and is modified with regard to the feasibility thereof if required. A position sensor is provided which generates a position signal according to the position of the element and supplies said signal to the control unit that considers said position signal during detection of the control signal. Detection of the control signal by means of the model is only carried out at predetermined control times of the desired position time history. The value of the control signal is detected at a control time by requesting that the summed-up, weighted difference between the desired position and the position predicted by the model becomes minimal for the next control times for said value of the control signal. The thus detected value of the control signal is applied at least until the next control time.

20 Claims, 1 Drawing Sheet

METHOD AND APPARATUS FOR POSITIONING A MOVABLE ELEMENT USING A GALVANOMETER ACTUATOR AND PRE-FILTERING

FIELD OF INVENTION

The present invention relates to a method and an apparatus for positioning a movable element, in particular a rotating mirror, according to a predetermined course of desired position values using a galvanometer actuator to which a control unit provides a control signal.

BACKGROUND OF INVENTION

In the prior art the control unit has been designed as a PID (proportional plus integral plus derivative) controller. Such a controller determines the control signal for the element from the position signal of a position sensor, by generating the deviation between the desired position and the actual measured position, the integral of such deviation, and their time derivative being used as input parameters for the controller. The disadvantage of this way of controlling is often inadequate accuracy in effecting rapid changes in the desired position signal.

U.S. Pat. No. 5,450,202 discloses a system to position a mirror by means of a galvanometer actuator operated in resonance mode and in which a control unit regulates the current through the actuator such that the mirror occupies with maximum accuracy a defined position at control times half the resonance period apart. The sequence of desired positions recurs cyclically, i.e. is the same in every run. The current flow between two consecutive control times is held at a constant level calculated by the control unit. The algorithm is designed to be adaptive in the sense that the deviation between the actual position and the desired position is recorded for every run based on information provided by a position sensor, and this deviation is used to calculate the value of the current for the desired position in the next run and minimize deviations. This correction is accomplished with a parameter derived from a model that considers the mirror and the actuator as a damped harmonic oscillator. This model is not adaptive. The disadvantage of this system is that the control strategy only works for systems running in a resonant mode in which a course of certain desired position values is repeated cyclically. On the one hand, the position can only be influenced at certain predetermined resonance times, and on the other hand the system does not provide an adequately accurate control for a course of set values that runs only once.

Patent publication JP-A 10023777 discloses a system for positioning a mirror the control unit of which uses a motion model of the mirror actuator to calculate the control signals using filters for the angular acceleration and the current of the motor.

Patent publication DE-A-43 44 283 discloses a control method for an electric motor that uses a model with an adaptive parameter determination.

Patent publication U.S. Pat. No. 5,233,512 discloses a control method for an electric motor that uses a model of the electric motor to control the error rate of the control method.

Patent publication U.S. Pat. No. 5,519,605 discloses a control method using a process model based on a step response or an impulse response.

SUMMARY OF INVENTION

The task of the present invention is to provide a method and an apparatus for positioning an element which enable the tracking of an arbitrary course of desired position values by the positionable element with maximum accuracy, using a minimum of calculation effort but nevertheless being suitable for high dynamic requirements.

The advantage of this invention is that the selected model, the selected control strategy, and the use of a pre-filter for checking and, if necessary, optimizing the course of desired position values allow an exact realization of this course of desired position values within the scope of the system while using little calculation effort and satisfying high dynamic requirements.

BRIEF DESCRIPTION OF THE DRAWINGS

The single FIGURE shows a block diagram of an embodiment of the control unit according to the invention.

DETAILED DESCRIPTION OF THE PREFERRED EMBODIMENTS

Figure 1:
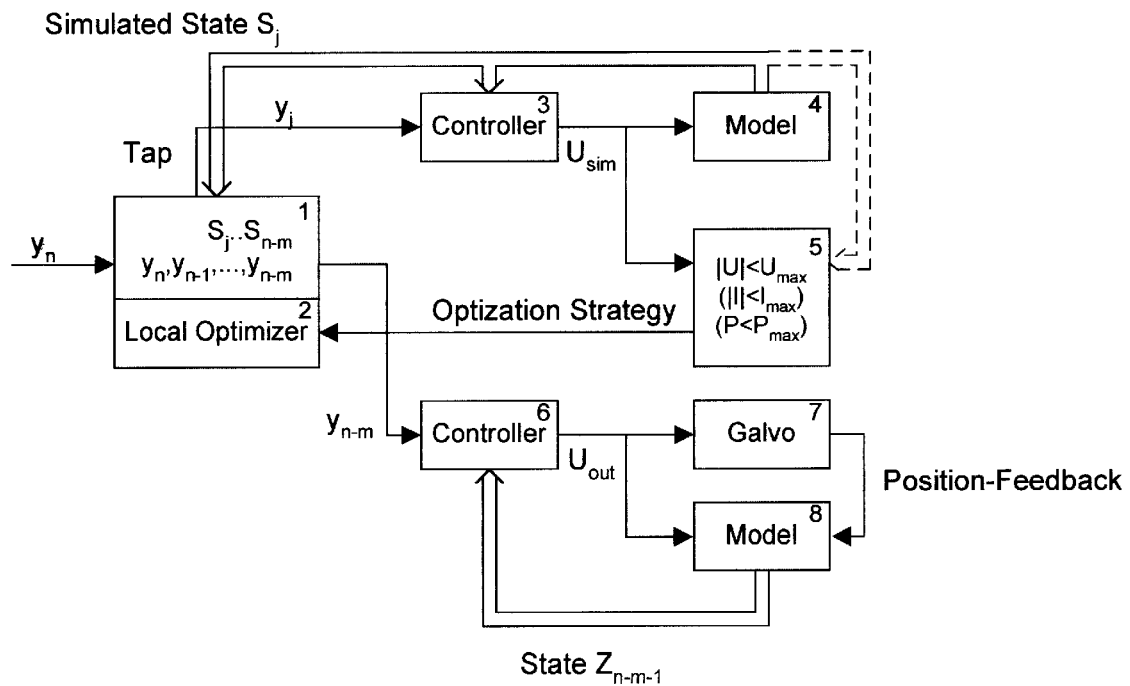

"Galvanometer actuator" is used herein to refer to any type of electromechanical equipment using magnetic fields produced by a current flow to position a movable element either cyclically or randomly. "Position sensor" refers to any type of device which tracks such a positioning motion and provides a signal from which the course of this motion can be reconstructed unambiguously to the desired accuracy. The term "control" refer in particular to feedback control, whereby the feedback is used either in the control algorithm to reconstruct the actual state of the system in part from measured data or as input for adjusting model parameters so as to produce a better model prediction at subsequent times or for both purposes. The term "control unit" refers especially to a digital controller based on a model, which may be any type of device or system that operates on the basis of a mathematical model for the galvanometer actuator (connected to the element to be positioned), and which model is able to determine a control signal for the actuator in such a way that a course of desired position values can be executed as accurately as possible, which may include keeping the actuator at a specified position. The control unit receives as input signals preferably at least the position signal determined and provided by the position sensor. "Model" as used in this invention is to be understood as any collection of calculation rules that permits prediction of the actuator's course of position values according to an at least piecewise constant variation of the control signal within an appropriate accuracy range. Preferably this will be the discrete state space model introduced below. The accuracy range is appropriate when the control signal determined by the controller causes the actuator to attain a desired position at the intended time with the average accuracy desired for the model-based control of the particular application in use at that time.

If necessary, the model parameters can be adjusted later in order to ensure conformity with reality, whereby the adjustment results from a comparison of the model prediction with the measured course of position values. In addition to an adjustment to the actual time variation of the system, the subsequent adjustment of model parameters can also enable the system to deal with the non-linearity of the actuator. This is normally done by choosing a linear model for the description of the actuator, which is normally simpler than the non-linear model, and then taking the non-linearity into account by subsequent adjustment of model parameters depending on position or state. This makes for a better adjustment of the predictive capacity of the model to reality.

Moreover, the control unit applies a pre-filter to the course of desired position values which identifies any physically impossible or impracticable desired position course according to the model and calculates a new model-based course of position values that can actually be achieved by the actuator and is as close as possible to the originally desired course of position values. This pre-filtering is, for the selected control strategy, especially necessary when the position signal has sharp discontinuities or requires unrealistic speed changes. The pre-filter allows the algorithm which ensures that a given course of desired position values is tracked with maximum accuracy to become simpler, that is requiring less computation effort, because it does not (as in the prior art) have to produce optimal performance with arbitrary boundary conditions.

In addition to the position signal from the position sensor, the control unit can use as input value the current flow inside the actuator or the actual speed of the motor shaft or both. To improve the accuracy to which a fixed position can be achieved and held, the system may contain an error integrator according to the integral segment of a PID controller, which can be either analog or digital, although an analog implementation is possibly advantageous due to lower digital noise.

The model used in this invention comprises a discrete time state space model, which produces a prediction for the actuator's behavior out of its input parameters.

The galvanometer actuator can be for example a so-called galvanometer scanner containing either a fixed coil and a rotating magnet or a fixed magnet and a rotating coil. The galvanometer actuator, however, can also be a linear motor with either a coil or a magnet which can be moved linearly. The galvanometer actuator can constitute the active part of a head positioning system for hard disks, which works, for example, with a movable coil and a fixed permanent magnet, while the position information is encoded on the magnetic surface of the disk.

Hereafter an example of the implementation of the invention is explained in detail. In this example the element to be positioned is a rotating mirror of an optical system, which is powered by a galvanometer actuator that consists of a rotating magnet turned by the magnetic field of a fixed coil through which an electrical current flows. The model is based on a differential equation that takes into account the electric resistance of the circuit R, the inductance L of the coil, the voltage U applied to the coil as input signal for the actuator, the torsion T (torque/current flow) and the moment of inertia J of the moving parts (magnet and mirror), for example as follows:

$$U = T\frac{d\vartheta}{dt} + L\frac{dI}{dt} + IR \qquad (1)$$

$$IT = J\frac{d^2\vartheta}{dt^2}$$

U: voltage applied to the coil
T: torsion constant
L: inductance of the electromagnet
R: circuit resistance
J: moment of inertia of the moving systems (permanent magnet, shaft, mirror)
$\vartheta$: time-dependent function of the angle the mirror will pass
I: time-dependent function of the current flow through the electromagnet Such a differential equation can also be described as a state space model in the form:

$$\dot{\vec{Z}}(t) = A\vec{Z}(t) + \vec{b}U(t) \text{ and } X(t) = \vec{c}^T\vec{Z}(t) \qquad (2)$$

where A is a matrix, b and c are appropriate vectors, U(t) is the input value, X(t) the output value, and Z(t) the state space vector. The parameters R, L, T, J appear generally in the matrix and in the vectors c and b. The components of the state space vector need not have an obvious physical meaning. However, it is possible to choose the matrix in such a way that the resulting state space vector is Z(t)=(X(t), V(t), I(t)), where X(t) represents the position, V(t) the velocity and I(t) the time dependent current. The solution of such a differential equation for X(t) and a continuous voltage U(t) produces a function $X(R, L, T, J, X_0, V_0, I_0, U(t), t)$, which, in addition to the physical parameters R, L, T, J of the scanner uses also the starting conditions $X_0$, $V_0$, $I_0$ and the input value U(t). For discrete time systems governed by a digital system the following solution follows from the above mentioned state space model:

$$\vec{Z}(k+1) = A_d\vec{Z}(k) + \vec{b}_dU(k) \text{ and } X(k) = \vec{c}_d^T\vec{Z}(k)$$

in which the state space vector, with an appropriate choice of $A_d$, uses the values of $X_k$, $V_k$, and $I_k$ that specify the position, the velocity, and the current at the time $t_k$, which is the sampling point at the $k^{th}$ interval. The equation describes the transition from state Z(k) into state Z(k+1) resulting from the input value U(k) (which is constant in the $k^{th}$ interval) and its intrinsic momentum $A_dZ(k)$. If a specific state Z(i) and the input values U(i), U(i+1), ..., U(k−2), U(k−1) are known the whole dynamic of the system from Z(i) to the sample interval k is predictable. As set out in equation (3), a solution for X(k) results from the scalar product of Z(k) with the vector C. This solution for X(k), where the vector Z(k) is obtained recursively from a known state Z(j) using U(i) with j≦i≦k−1, is hereafter denoted as X(R,L,T,J,Z(j), k). Its dependence on the sequence $\{U_k\}$ of all system input values $U_j$ up to the $k^{th}$ sample, starting with $U_j$, is suppressed. Z(0) is the initial state of the system and must be initialized according to the system's start conditions.

To this point no measured data, such as the actual measured position or the measured current, have been used. However, if $A_d$ is selected in the right way the state vector Z will contain these values. Thus it is possible to replace the calculated values in part with measured values after every iteration step k according to equation (3) in the calculated state vector Z(k+1). The present invention uses such an approach, turning an open-loop control system into a closed-loop one. According to the single FIGURE this iteration task and the subsequent replacement of calculated values with measured values is implemented by module 8.

Measured data can be filtered before use, for example to increase the signal to noise ratio. For that purpose of course a filter can be added to the model.

For a general application case a function Y(t), a course of desired position values, is assumed as given as an angular trajectory with time which has to be tracked by the actuator or the mirror with maximum accuracy. This can usually be achieved by choosing U(t) in an appropriate way such that $Y(t)=X(R,L,T,J,X_0,V_0,I_0,U(t),t)$ applies.

In the prior art, U(t) is usually produced by a PID controller that normally calculates U(t) based on the error Y(t)−X(t), the error integral, and the angular velocity or the first derivative of the error value as input values. For comparatively slow motions or reduced requirements on dynamic accuracy optimizing controllers based on impulse response can be used. If the impulse response cannot be restricted to a few samples due to its insignificant contribution at long times (U.S. Pat. No. 5,519,605), the choice of this model adversely affects the performance of the controller, the model's adaptation to changing boundary conditions, and the incorporation of nonlinearities.

It is the objective of the present invention to provide a controller that can achieve a good tracking of desired position values even under high dynamic requirements.

For this purpose a controller is provided that explicitly contains the model of the actuator and uses it to optimize the control voltage based on the current state of the actuator and the course of future desired position values without inclusion of given limitations for optimization.

The response times of such an actuator normally lie in the millisecond range. To ensure only a minimal deviation from the course of desired position values even with rapid changes of the signal the controller has to sample the current position as frequently as possible and correct the control voltage accordingly, for example once every 20 microseconds. For faster actuators even higher sampling rates must be contemplated.

To be able to use such high sampling rates, conventional optimizing controllers as are used for process control and monitoring in the chemical industry, must be modified in several ways.

In the prior art, a model is usually provided having a step response or impulse response. Such a step response cannot be used in galvanometer actuators because the actuator would exceed its specifications.

The impulse response for a galvanometer actuator normally makes significant contributions also at later points in time, which cannot be suppressed in an exact model description. Therefore, the usual method of limiting the impulse response to the section where it changes significantly leads to a still rather high data volume of 200 to 300 values for the highest accuracy requirements. Since these data are used in every calculation step, the maximum achievable sampling rate declines and consequently also the achievable control accuracy at high dynamic requirements. Furthermore, all these values have to be corrected if slowly varying parameters (R, T, . . . ) or nonlinearities are to be included in the description of the model.

The system presented here is different from the usual approach in that it uses a discrete state space model (3), which is able to store the actuator's entire system behavior in, for example, 6 to maximum 15 parameters.

To realize the course of desired position values with maximum accuracy it is principally desirable to actually determine the above identified function $X(R, L, T, J, X_0, V_0, I_0, U(t), t)$ and calculate a $U(t)$ for a specified $Y(t)$. In a digital control system with physically realistic curves Y (no voltage U(k) appears which is not available) it can only be postulated that the interval between desired and actual values per sample k shall be small:

$$|Y(t_k) - X(R, L, T, J, V_0, I_0, U(t_k), t_k)| \leq \epsilon \quad (4)$$

The requirement (4) set out above does not have to refer to individual available samples, but can also be understood in reference to possible over-sampling.

Requirement (4) can be fulfilled in many different ways. Usually it is required that a weighting function in the form:

$$J = \sum_{i=n+1}^{n+m+1} \alpha_i (Y(i) - X(R, L, T, J, Z(n), i))^2 + \beta_i U(i)^2 \quad (5)$$

be minimized, where $\alpha_i$, $\beta_i$ are two weighting sequences. This is an optimization task that can be solved through a variety of procedures in addition to the least squares method.

The disadvantage of these common methods for determination of the output voltage U(n) by optimization is the high calculation effort and consequently the limited suitability for use with high dynamic requirements. The output voltage of controllers of the prior art for example is usually determined by solving a diophantine equation or applying a method of linear optimization. This situation is aggravated by several orders of magnitude when during optimization boundary conditions have to be observed. Steps that seem to be useful in processes which take a minute or a second turn out to be impossible in the 10 microsecond range.

To respond to the increased sample rate that the present invention allows, only a short interval of the future course of desired position values is optimized, which is small compared to the step response and should not exceed 10 samples (sampling or control points in time), for example 3 to 5 samples. Explicit inclusion of the voltage values into the optimization does not take place, that is, all $\beta_i$ are set to zero. In addition, the boundary conditions do not have to be observed for the optimization.

To save additional calculation time, in the present invention only a single voltage is specified for optimization, and this voltage is assumed to be a constant during the optimizing process for the selected samples (future sample and control times). The optimization is carried out as if there were a constant voltage during the relevant section of the course of desired position values. Ideally the so specified voltage is only applied at the following sample and the algorithm is repeated at the next sample time. The result of this procedure is a discrete controller law in form of a sum of two scalar products:

$$U = \langle \text{Reg1} | \text{Spos}_n \rangle + \langle \text{Reg2} | Z_n \rangle$$

Reg1 and Reg2 are two vectors which are specified through the parameters that the galvanometer actuator is based on (R,L,T, . . . ) or the system's eigen-values according to a specific formula. This formula is derived naturally from the optimization rule. $\text{Spos}_n$ is the at maximum 10-dimensional vector, which is formed by the future desired values $y_{n+i}$ starting from the current desired value $y_{n+1}$, and $Z_n$ is the current state of the system. The first scalar product is formed between two vectors having at most ten dimensions and the vectors of the second system have the dimensions of the order of the system. The vectors of a model without oscillator are 3-dimensional. If an oscillator formed by the magnet, the motor shaft, and the mirror is taken into account, the whole model is 5-dimensional.

Hereafter an example is described in which the optimization is performed using only two samples, that is, the two directly following samples. It is required that the sum $$\sum_{i=n+1}^{n+2} (Y(i) - X(R, L, T, J, Z(n), i))^2 = \left(Y(n+1) - c^T A_d \vec{Z}(n) + c^T \vec{b} U(n)\right)^2 + \left(Y(n+2) - c^T A_d^2 \vec{Z}(n) + c^T A_d \vec{b} U(n) + c^T \vec{b} U(n+1)\right)^2$$

be minimized, where Z(n) is provided according to unit 8 in the Figure. An explicit controller law is obtained by differentiating the above expression by U(n) and setting the resulting term to zero. In this way a voltage is calculated that will bring the movements of the scanner with very high accuracy to the two following time points to be reached. Then the calculated voltage is preferably used only for one sample and the calculation is repeated for i=n+2 and so on, or it is actually used for the calculated time and the calculation is repeated for i=n+3. As described above this method can be used for more than two, but preferably less then 10 points.

However, this efficient controller law also has a drawback. It calculates without any compromise the specific voltage the system has to apply in order to remain in proximity to the desired value sequence. If the optimization horizon is chosen to be small ($\leq 5$), for example a dynamic accuracy of up to 14 bits is possible even with maximum acceleration. But the controller law fails if a voltage for tracking the course of desired position values is calculated that is not attainable.

For this reason the course of desired position values has to be checked for physical feasibility in real time and if necessary replaced by a course of position values that is as close as possible to the original curve but does not violate limitations.

This is ensured by a pre-filter, which is shown in further detail in the only Figure. It serves for checking any input course of desired position values for their feasibility and corrects them if necessary. The corrected curve should be as close as possible to the desired course without violating any boundary conditions.

For this reason the course of desired position values is delayed in an m+1—stage shift register (or a cyclic buffer) 1 while they are analyzed in the buffer. The actual control loop of the system, which consists of the controller 6, the galvanometer actuator 7, and the model 8, receives the course of desired position values delayed by m steps.

For analysis the complete control loop including the galvanometer actuator 7 can be simulated and checked for failures by means of an input monitor 5. For this purpose a simulator consisting of a simulated controller 3, the model 4, and the input supervisor 5 receives the course of desired position values through a tap of the shift register 1 and provides states that are correlated with the desired values back to the shift register. If a violation of given conditions occurs a local optimizer 2 with a certain optimizing strategy is started depending on the type of violation. This optimizer generates a new course of position values in the shift register 1 that does not violate any limitations. It tries to pick up the course of desired position values on both sides of the section within the shift register and adhere to it as closely as this is possible without violating any limitations. This test takes place iteratively and delivers as a result the course of desired position values to be replaced. The central element of the local optimizer is a matrix equation that is developed from the state space model. With this matrix equation n (Galvo) input values U are calculated based on an initial state and a sequence of n final values to be attained. These input values U must be applied over n tunable time intervals to reach the n desired final values. The variable n should be of the same magnitude as the system order. Preferably the simplified galvanometer model from equation (1) is used to obtain n to 3. A special advantage of determining the optimization through voltage values is the fact that only a few voltage values can describe curve courses over a relatively long time period of 2–3 milliseconds. If the input monitor detects a problem the whole simulated control process is stopped and more time for calculation is made available. This calculation time is received by the optimizer, which tries to start from a state in the shift register that existed a long time before the problem occurred during long time intervals to pick up at desired positions at the beginning of the shift register. If the voltage values obtained from the matrix equation remain below $U_{max}$ the time intervals will be shortened. In this manner the system gradually works itself up to the optimum time interval. For this purpose the method of successive approximation as is used in analog/digital converters is helpful because it enables the system to find the optimum time window with an accuracy of 1/256 with only 8 attempts. Once the voltage values have been determined after a few iterations—preferably eight—the local optimizer 2 calculates the curve segment by using the discrete state space model. This curve segment bridges the error spot and is linked to both sides of the curve course that is to be found in the shift register. The system state which the local optimizer used in its last optimizing step is now used as the input state for the model. This curve generation does not require an additional calculation effort, since the optimizer has completed its job. (Thus additional time for calculation is made available). The curve course thus generated does not violate any limitations because it was constructed under these limitations. Upon generation of the curve course the simulator of the control loop is initialized again and runs in place of the curve generation, whereby the initial state of the pre-filter is reestablished.

The main system limitation is the maximum voltage to be applied. This condition is easy to check during the optimizing routine since it only has to be checked if the voltage values of the current iteration step are smaller than $U_{max}$. If this is the case, the next optimizing step follows. If not, the voltage values are selected from the last optimizing step.

The maximum voltage for galvanometer actuators is a global optimizing parameter. If it is reduced the maximum current flow and the power output are reduced as well. This means that by reducing $U_{max}$ a galvanometer actuator can be protected against overheating with some loss of its performance capability whereby full compatibility with the optimizing routine is retained. During this procedure the monitor can determine the average output power since it is provided with the simulated states of the galvanometer. The monitor also determines whether $U_{max}$ has to be reduced to protect the galvanometer against overheating.

It is also possible to do without a complete simulation of the control loop such that the components 3, 4, and 5 can be omitted. In this case the monitoring capacity is limited, and the local optimizer 2 would have to take care of both the monitoring and the optimization. The results of the above mentioned matrix equation, the voltage values, have to be routed into a discrete state space model, which then calculates the state that is needed for the equation in the next step. If this method is chosen, a reduction of calculation effort cannot be expected.

Once a specific curve course has been tracked the position values $X_i$, the input values for the actuator U(i), and if necessary I(i), which are provided by the feedback routine and belong to the intervals i, can be stored in memory, and the parameters R,L,T, and J and thus the whole model can be continuously adjusted by minimizing the expression $$\sum_{i=n+1}^{n+m} (X_i - X(R, L, T, J, Z(n), i))^2$$

in which one can also restrict the parameter set. During this optimization the state Z(n) is either known or assumed as unknown and then established during optimization. In this way, for example, a resistance value fluctuating because of temperature changes can be adjusted. This adaptive procedure can be established to increase the prediction accuracy of the model, but it is not necessary in every individual case.

The parameter T usually has an angular dependence $T=T(X)$. This means that the differential equation generally becomes non-linear. Setting T to the right values during the movement can alleviate this problem. In this approach the model is expanded to $$X=X(R,L,T_{i-1},J,Z(i-1),i) \text{ with } T_{i-1}=T((X_i+X_{i-1})/2),$$

to name only one way of discretizing $T(X)$. Generally one applies a method of dealing with non-linearity by including it as stepwise changes.

The model described by the differential equation stated above does not allow for the naturally occurring friction, the angular dependence of the torsion, the inherent resonance of the oscillator (which is formed by the magnet, the shaft of the mirror mounting, and the mirror) or effects resulting from the fact that the moving permanent magnet magnetizes its environment. Also, the position detector is assumed to be ideal, that is, that it delivers the true position information. The model can be extended to meet higher accuracy requirements.

An extended model, which considers the oscillator's motion because of the limited rigidity of the rod connecting actuator and mirror, can be described with the following differential equation:

$$= T\frac{d\vartheta}{dt} + L\frac{dI}{dt} + IR$$

$$IT - K(\vartheta - \varphi) = J\frac{d^2\vartheta}{dt^2}$$

$$K(\vartheta - \varphi) = J\frac{d^2\varphi}{dt^2}$$

where K is the rigidity of the connecting rod in regard to the rotation.

For a linear motor which operates vertically the following differential equation is valid:

$$= B\frac{dX}{dt} + L\frac{dI}{dt} + IR$$

$$IB + gm = m\frac{d^2X}{dt^2}$$

In this equation:
U=voltage applied to the electromagnet;
B=acceleration constant
L=inductance of the electromagnet
R=resistance opposed to the current
m=mass of the moving system (permanent magnet, mounting rod, mirror)
X=time dependent function of the location the mirror is supposed to pass through
I=time dependent current flow through the electromagnet.

If the linear motor is operated horizontally the term gm is omitted in the second equation.

What is claimed is:

1. A method for positioning a movable element of a system according to an arbitrary time-varying course of desired position values, said system comprising a galvanometer actuator; the movable element, said movable element being connected mechanically to said galvanometer actuator in such a way that motion of a movable portion of said galvanometer actuator moves the element; a control unit comprising a discrete-time state-space model of the properties of the subsystem of the element and the galvanometer actuator taken together, said model having parameters and being used to generate a control signal, and the control unit sending the control signal to the galvanometer actuator in order to position the element according to the arbitrary time-varying course of desired position values, said course of position values having sample times; and a position sensor which generates a position signal according to the position of the element and supplies the position signal to the control unit; said method comprising the steps of:

A. selecting the properties of the model such that the model can predict the time-varied course of position values of the element for an arbitrary time varying course of control values with a predetermined accuracy;

B. pre-filtering the course of desired position values, said pre-filtering comprising the substeps of:
  i. verifying the physical feasibility of the course of desired position values;
  ii. modifying the course of desired position values as necessary to conform to physical feasibility;
  iii. transmitting to the control unit a resulting physically feasible course of desired position values;

C. developing and sending to the galvanometer actuator a control signal from the prefiltered course of desired position values using the following substeps:
  i. establishing a sequence of predetermined control times related to the sample times of the course of desired position values;
  ii. establishing a predetermined number of control times subsequent to the present control time;
  iii. taking into account the position signal;
  iv. calculating the value of the control signal to be sent at the first of the predetermined control times by the substep repeated at each control time by imposing the condition that the control signal is chosen to minimize a function of the weighted differences between the desired position given by the prefiltered course of desired position values and the positions predicted by the model for a subsequence of predetermined control times subsequent to the present control time, said subsequence being the predetermined number of control times immediately after the current predetermined control time;
  v. sending to the galvanometer actuator the calculated control signal; and
  vi. repeating substeps ii iii, iv, and v for each successive control time until the end of the sequence of predetermined control times is reached.

2. The method of claim 1 in which the predetermined number of control times in the predetermined number of control times subsequent to the present control time is at least two and not more than ten.

3. The method of claim 1 in which the function minimized in the substep of minimizing is the weighted sum of the squares of the differences.

4. The method of claim 1 in which the pre-filtering step is limited to only a portion of the course of desired position values.

5. The method of claim 4 in which the pre-filtering of step B is performed by the following substeps:
  a. storing a section of the course of desired position values in a shift register or a cyclic buffer;
  b. analyzing for physical feasibility the stored section of the course of desired position values;

c. computing a modified feasible course of position values if the stored course of desired position values was found not to be feasible in substep b;

d. replacing the stored course of desired position values with the feasible course if one is calculated in substep c; and e. successively transmitting the pre-filtered course of position values to the control unit with a delay according to the length of the shift register or the cyclic buffer respectively.

6. The method of claim 5 in which substep b is performed by the following subsubsteps:

i. calculating a course of control values necessary to realize the section of the stored course of desired position values; and ii. checking said calculated control values for feasibility.

7. The method of claim 6 in which sub/step i is performed by simulating the control loop including the actuator.

8. The method of claim 5 in which the calculation of the physically feasible course of desired position values in substep c is performed optimizing control by optimizing control signals with the boundary condition of their feasibility.

9. The method of claim 8 which the calculated section of the course of desired position values is linked to both sides of the original course of position values within the shift register or the cyclic buffer respectively during optimization.

10. The method of claim 8 in which the optimizing step is repeated iteratively.

11. The method of claim 1 in which the parameters of the model are varied, taking into account a comparison between the model prediction and the position signal, for optimization of the model prediction.

12. The method of claim 11 in which the model is selected to be linear and the model parameters are adjusted to eliminate nonlinearities of the subsystem of the element and the galvanometer actuator taken together.

13. The method of claim 1 in which current flowing in the galvanometer actuator is measured and is used as an input to the control unit for calculating the control signal.

14. The method of claim 1 in which the control unit additionally comprises an integrator, additionally comprising the steps of said integrator integrating the difference between the course of desired position values and the measured position values and using the result for the calculation of control values.

15. The method of claim 1 in which the control signal is a voltage applied to the galvanometer actuator.

16. An apparatus for positioning a movable element according to an arbitrary time-varying course of desired position values, said course of position values having sample times, said apparatus comprising:

a. a galvanometer actuator having a movable portion;

b. a movable element connected mechanically to said movable portion of said galvanometer actuator in such a way that motion of the movable portion of said galvanometer actuator moves the movable element;

c. a position sensor generating a position signal according to the position of the element;

d. a pre-filter that determines the physical feasibility of the course of desired position values, modifies the course of desired position values as necessary to conform to physical feasibility, and transmits a resulting physically feasible course of desired position values; and e. a control unit comprising a discrete-time state-space model of the properties of the combination of the element and the galvanometer actuator, said model having parameters, said model being capable of predicting a time-varying course of position values of the element for an arbitrary time varying course of control values with a predetermined accuracy, said model being used in calculating the control value by variation of parameters, by minimizing a function of the weighted differences between the desired position given by the pre-filtered course of desired position values and the position predicted by the model for a subsequence of predetermined control times subsequent to the present control time, said subsequence being the predetermined number of control times immediately after the current control time, the value to be sent at control times related to the sample times of a control signal that the control unit transmits to the galvanometer actuator to position the element according to the arbitrary time-varying course of desired position values.

17. The apparatus of claim 16 in which the movable element is a rotating mirror of an optical system and in which the galvanometer actuator comprises either a fixed coil and a rotating magnet or a fixed magnet and a rotating coil.

18. The apparatus of claim 16 in which the galvanometer actuator is a linear motor.

19. The apparatus of claim 16 in which the galvanometer actuator is the drive mechanism of a head-positioning system for a hard disk drive and the position signal is produced using position information encoded on the disk.

20. The apparatus of claim 16 in which the control signal is a voltage applied to the galvanometer actuator.

* * * * *